(12) United States Patent
Ochiai

(10) Patent No.: US 11,083,178 B2
(45) Date of Patent: Aug. 10, 2021

(54) SPINNING REEL

(71) Applicant: Shimano Inc., Osaka (JP)

(72) Inventor: Koji Ochiai, Osaka (JP)

(73) Assignee: Shimano Inc., Osaka (JP)

(*) Notice: Subject to any disclaimer, the term of this patent is extended or adjusted under 35 U.S.C. 154(b) by 77 days.

(21) Appl. No.: 16/676,674

(22) Filed: Nov. 7, 2019

(65) Prior Publication Data

US 2020/0205386 A1 Jul. 2, 2020

(30) Foreign Application Priority Data

Dec. 26, 2018 (JP) .............................. JP2018-242862

(51) Int. Cl.
*A01K 89/01* (2006.01)

(52) U.S. Cl.
CPC ................................ *A01K 89/0111* (2013.01)

(58) Field of Classification Search
CPC ........ A01K 89/011223; A01K 89/0114; A01K 89/0111

See application file for complete search history.

(56) References Cited

U.S. PATENT DOCUMENTS

| 2009/0272831 A1* | 11/2009 | Matsuo .............. A01K 89/0111 |
| | | 242/322 |
| 2015/0090820 A1* | 4/2015 | Ochiai .............. A01K 89/0114 |
| | | 242/242 |
| 2019/0133102 A1* | 5/2019 | Tsutsumi ......... A01K 89/01126 |

FOREIGN PATENT DOCUMENTS

| JP | 11-276035 A | 10/1999 |
| JP | 2006-197848 A | 8/2006 |
| JP | 3898136 B2 | 1/2007 |

OTHER PUBLICATIONS

GB Search Report of corresponding GB Application No. 1917957.1 dated Jun. 17, 2020.

* cited by examiner

*Primary Examiner* — Emmanuel M Marcelo
(74) *Attorney, Agent, or Firm* — Global IP Counselors, LLP

(57) ABSTRACT

A spinning reel for casting a fishing line in a forward direction includes a reel body, a spool shaft, a pinion gear, a bushing and a bearing. The spool shaft is supported by the reel body so as to be movable in the longitudinal direction. The pinion gear has a tubular shape and an interior, the spool shaft penetrating through the interior. The bushing has a support portion supporting the spool shaft, and a housing portion that has a larger diameter than an inner diameter of the support portion and that is fixed to the reel body by press-fitting. The bearing is attached to the housing portion of the bushing and supporting the pinion gear.

5 Claims, 4 Drawing Sheets

SPINNING REEL

CROSS-REFERENCE TO RELATED APPLICATIONS

This application claims priority to Japanese Patent Application No. 2018-242862, filed on Dec. 26, 2018. The entire disclosure of Japanese Patent Application No. 2018-242862 is hereby incorporated herein by reference.

BACKGROUND

Field of the Invention

The present invention relates to a fishing reel, particularly to a spinning reel that can cast or unreel a fishing line in a forward direction.

Background Art

In a spinning reel, a spool shaft moves back and forth in reciprocating fashion relative to a reel body in accordance with the rotation of the handle. A rear portion of the spool shaft is supported by the reel body via a collar member (support member). When the spool shaft moves back and forth in reciprocating fashion, the spool shaft slides with respect to the collar member. The collar member is supported by a bearing disposed in the reel body. The bearing is disposed in a mounting portion disposed in the reel body and supports the rear end of a pinion gear so as to be freely rotatable (refer to Japanese Patent No. 3898136).

Here, when the spool shaft moves back and forth with respect to the reel body, if the rattling of the spool shaft in the radial direction with respect to the reel body is pronounced, the sliding feeling can be adversely affected. For example, in Japanese Patent No. 3898136, since the dimensions of the parts, such as the inner diameter of the mounting portion, the outer diameter of the pinion gear, the inner and outer diameters of the collar member, and the outer diameter of the spool shaft, affect the rattling of the spool shaft in the radial direction with respect to the reel body, if the dimensional accuracy of each of these parts is not increased, the rattling of the spool shaft in the radial direction with respect to the reel body will become pronounced and the sliding feeling can be adversely affected.

SUMMARY

The object of the present invention is to suppress the rattling of the spool shaft in the radial direction with respect to the reel body to improve the sliding feeling.

A spinning reel according to one aspect of the present invention can unreel or cast a fishing line in a forward direction. The spinning reel comprises a reel body, a spool shaft, a pinion gear, a bushing, and a bearing. The spool shaft is supported by the reel body so as to be movable in the longitudinal direction. The pinion gear has a tubular shape and the spool shaft penetrates the interior thereof. The bushing is fixed to the reel body by press-fitting. The bushing has a support portion that supports the spool shaft and a housing portion that has a larger diameter than the inner diameter of the support portion. The bearing is attached to the housing portion of the bushing and supports the pinion gear.

In this embodiment of a spinning reel, the spool shaft is supported by the support portion of the bushing that is fixed to the reel body by press-fitting. In this embodiment, the portions that affect the rattling of the spool shaft in the radial direction with respect to the reel body are the inner diameter of the support portion of the bushing and the outer diameter of the spool shaft, so that there are few portions that affect the rattling of the spool shaft in the radial direction. As a result, since the rattling of the spool shaft in the radial direction with respect to the reel body is suppressed, it is possible to improve the sliding feeling. In addition, since the bearing that supports the pinion gear is attached to the housing portion of the bushing, for example, compared to the structure in which the bearing is directly attached to the reel body, the pinion gear can be accurately supported by the bearing.

Preferably, the bearing has an outer race that contacts the inner peripheral portion of the housing portion of the bushing and an inner race that contacts the outer peripheral portion of the pinion gear.

Preferably, the reel body has a hole into which the bushing is press-fitted, and the bushing has a rib that projects from the outer peripheral portion in the radial direction. In this embodiment, the press-fitting of the bushing into the hole is facilitated by the rib.

According to the present invention, it is possible to suppress the rattling of the spool shaft in the radial direction with respect to the reel body to improve the sliding feeling.

DETAILED DESCRIPTION OF EMBODIMENTS

Figure 1:
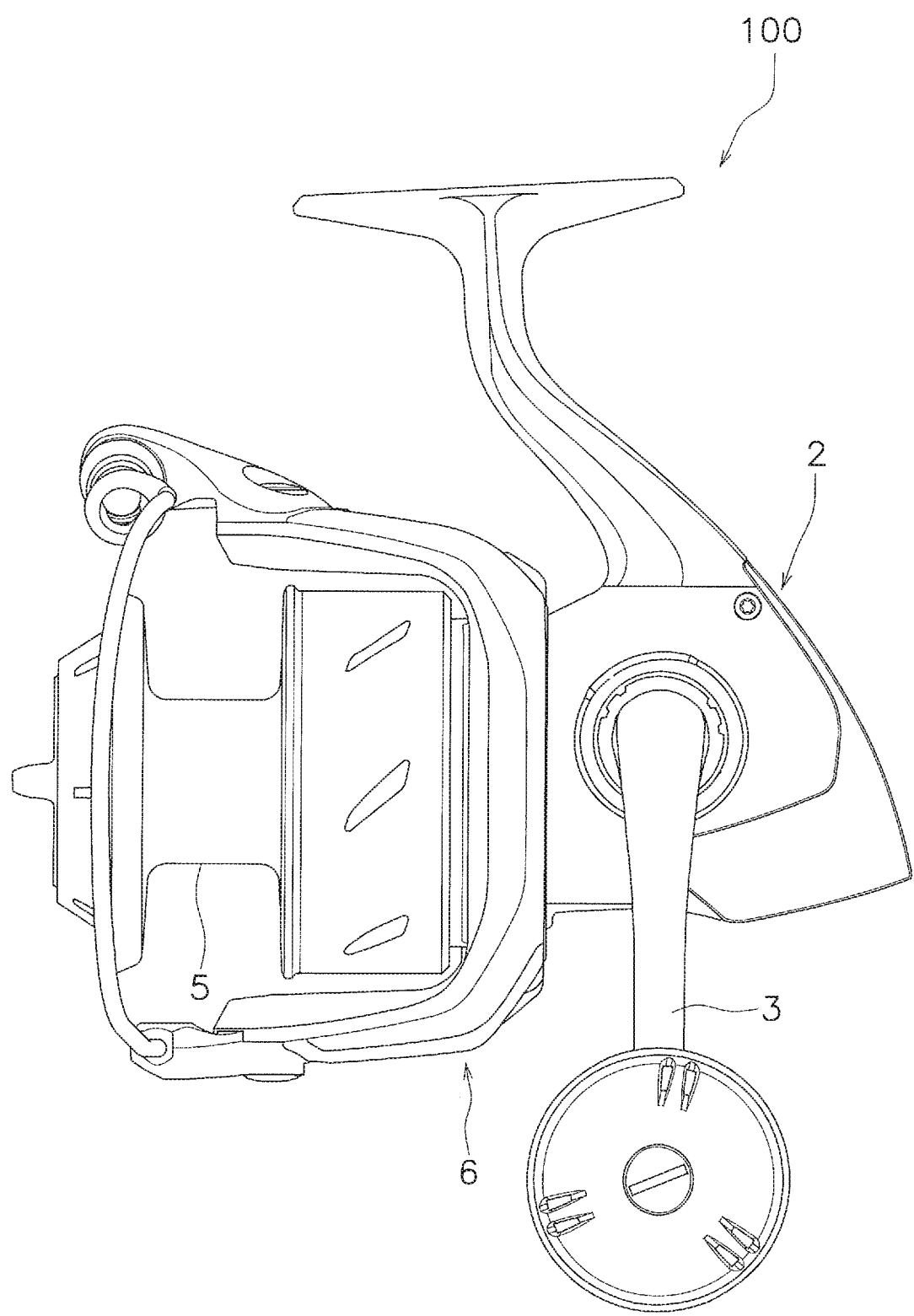
FIG. 1 is a side view of a spinning reel employing one embodiment of the present invention.
Figure 2:
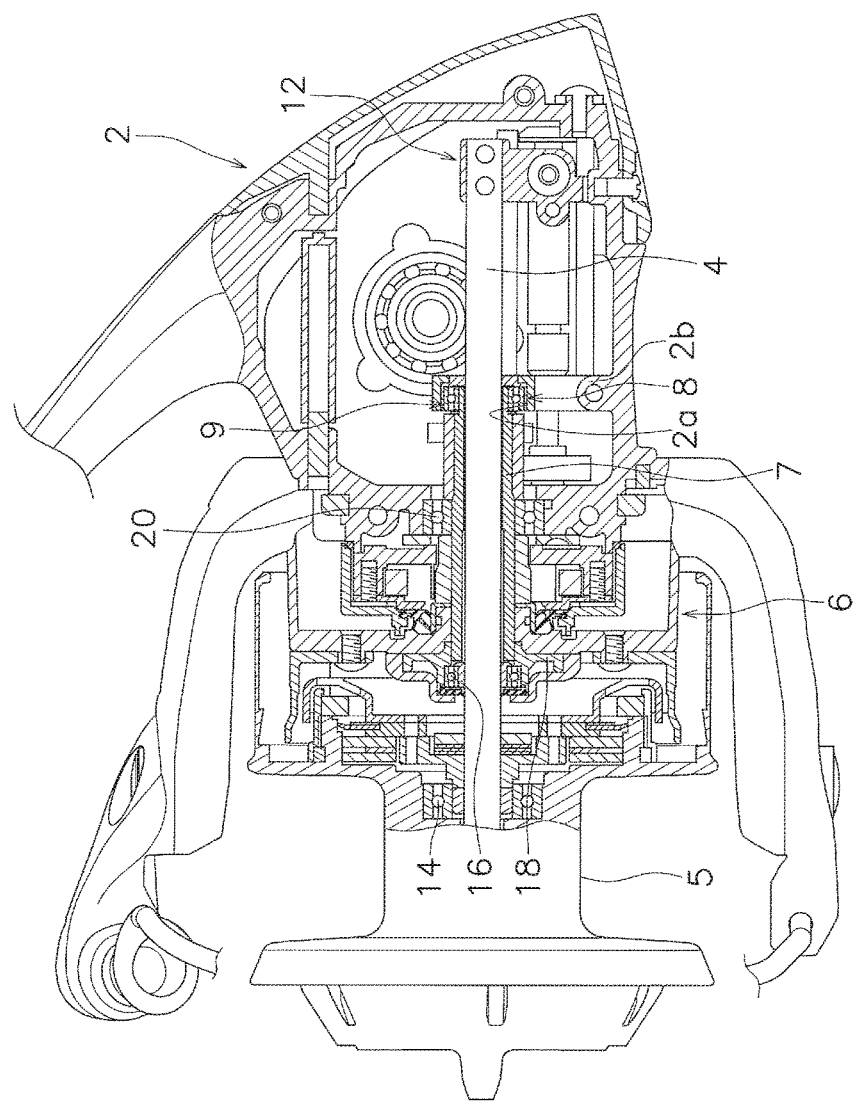
FIG. 2 is a cross-sectional view of the spinning reel.

A spinning reel 100 employing one embodiment of the present invention can cast a fishing line in a forward direction. As shown in FIGS. 1 and 2, the spinning reel 100 comprises a reel body 2, a handle 3, a spool shaft 4, a spool 5, a rotor 6, a pinion gear 7, a bushing 8, and a bearing 9.

In the following description, the direction in which a fishing line is casted or unreeled during fishing is referred to as the front, and the opposite direction is referred to as the rear. Further, left and right mean left and right when the spinning reel 100 is viewed from the rear. In addition, the direction in which the spool shaft 4 extends is referred to as the axial direction. The direction that is orthogonal to the spool shaft 4 is referred to as the radial direction. In addition, the direction around the axis of the spool shaft 4 is referred to as the circumferential direction. The axial direction in the present embodiment coincides with the longitudinal direction.

As shown in FIG. 2, the reel body 2 has an internal space, and the internal space houses an oscillating mechanism 12 and a portion of a rotor drive mechanism, which is not shown, that drives the rotor 6.

Figure 3:
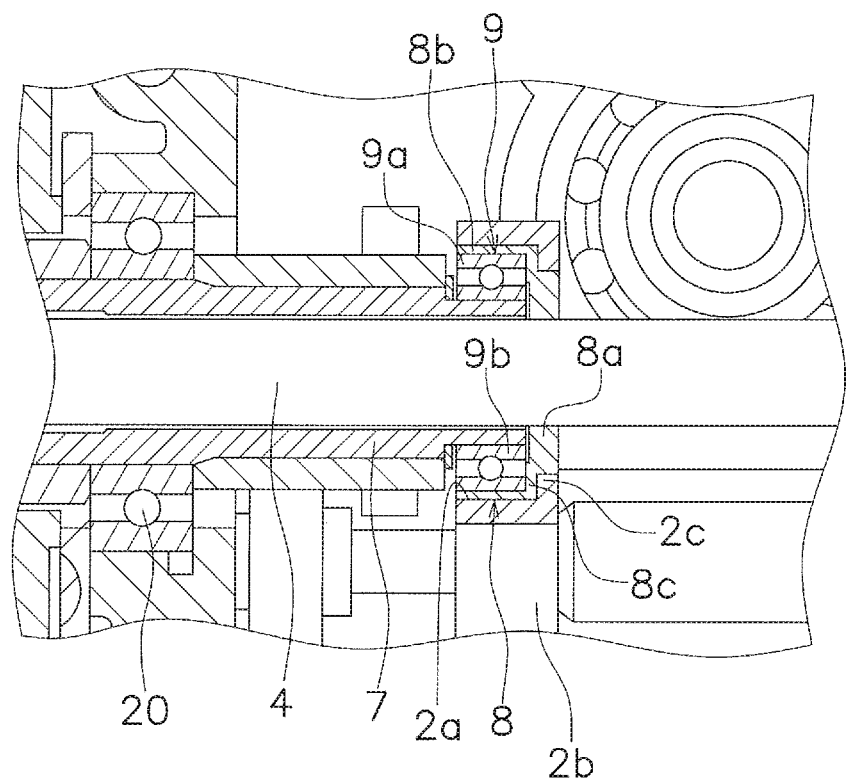
FIG. 3 is an enlarged cross-sectional view around a housing portion.

As shown enlarged in FIG. 3, the reel body 2 has a mounting portion. The mounting portion of the reel body 2 has a hole 2a into which the bushing 8 is press-fitted. The hole 2a has a tubular shape and is formed axially penetrating a wall portion 2b that is formed extending in the radial direction inside the internal space of the reel body 2. A positioning projection 2c that positions the bushing 8 is formed at the rear of the hole 2a. The positioning projection 2c is formed projecting in annular form from the rear of the hole 2a toward the radially inward side.

As shown in FIG. 1, the handle 3 is supported by the reel body 2 so as to be rotatable. In the present embodiment, the handle 3 is mounted on the left side of the reel body 2. The handle 3 can also be mounted on the right side of the reel body 2.

The spool shaft 4 extends in the longitudinal direction, and is supported by the reel body 2 so as to be movable in the longitudinal direction. As shown in FIG. 2, the front portion of the spool shaft 4 is supported by a bearing 14 disposed inside the spool 5 via a collar member, and an intermediate portion thereof is supported by a bearing 16 disposed on an inner peripheral portion of a nut member (nut) 18, described further below, via a collar member. In addition, as shown in FIG. 3, a rear portion of the spool shaft 4 is supported by a support portion 8a of the bushing 8, described further below. The spool shaft 4 moves the reel body 2 back and forth in reciprocating fashion by the oscillating mechanism 12 in accordance with the rotation of the handle 3.

The spool 5 is the member around the outer periphery of which the fishing line is wound. The spool 5 is mounted on the spool shaft 4 by a nut member (or nut), which is not shown, that screws onto the distal end of the spool shaft 4 and moves integrally with the spool shaft 4. That is, the spool 5 moves back and forth in reciprocating fashion relative to the reel body 2 together with the spool shaft 4 in accordance with the rotation of the handle 3.

The rotor 6 can rotate relative to the reel body 2 and winds the fishing line around the spool 5 in accordance with the rotation of the handle 3. The rotor 6 is connected to the pinion gear 7 so as to be integrally rotatable by the nut member 18 that screws onto the distal end of the pinion gear 7.

The pinion gear 7 is a hollow tubular member, and the spool shaft 4 penetrates the interior thereof. The pinion gear 7 and the spool shaft 4 include a slight gap therebetween in the radial direction. The handle 7 is supported by the reel body 2 so as to be freely rotatable. Specifically, an intermediate portion of the pinion gear 7 is supported by a bearing 20 disposed in the reel body 2. A rear end portion of the pinion gear 7 is supported by the bearing 9. The rotation of the handle 3 is transmitted to the pinion gear 7 via the rotor drive mechanism. When the rotation of the handle 3 is transmitted to the pinion gear 7, the pinion gear 7 and the rotor 6 rotate integrally with respect to the reel body 2.

Figure 4:
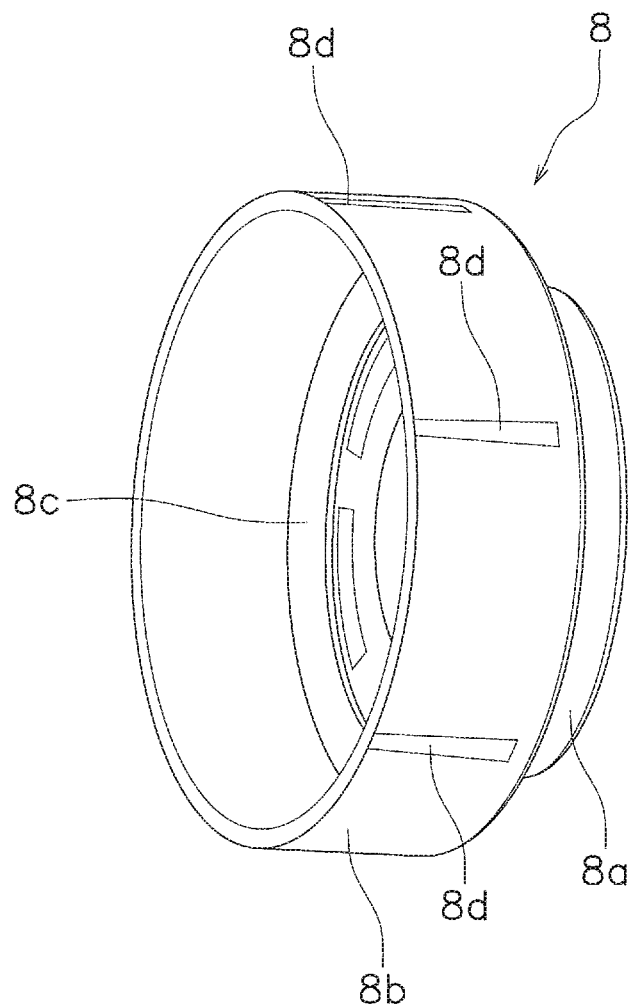
FIG. 4 is a perspective view of a bushing.

As shown in FIGS. 3 and 4, the bushing 8 has a cylindrical shape and is fixed to the hole 2a of the reel body 2 by press-fitting. The bushing 8 is formed from, for example, a synthetic resin or a metal such as stainless steel. The bushing 8 has the support portion 8a, a housing portion 8b, and a connection portion 8c. Preferably, the bushing 8 also has one or more ribs 8d.

The support portion 8a supports the spool shaft 4. The support portion 8a has a cylindrical shape, and the inner circumferential surface is in contact with the outer circumferential surface of the spool shaft 4. When the spool shaft 4 moves back and forth in reciprocating fashion, the outer circumferential surface of the spool shaft 4 slides with respect to the inner circumferential surface of the support portion 8a. The support portion 8a overlaps a portion of the hole 2a in the radial direction.

The housing portion 8b has a cylindrical shape and is integrally formed with the support portion 8a. The outer diameter of the housing portion 8b is larger than the outer diameter of the support portion 8a. The inner diameter of the housing portion 8b is larger than the inner diameter of the support portion 8a.

The connection portion 8c connects the support portion 8a and the housing portion 8b. The connection portion 8c extends in annularly in the radial direction so as to connect the front end portion of the support portion 8a and the rear end portion of the housing portion 8b. As shown in FIG. 3, the rear portion of the connection portion 8c contacts the positioning projection 2c of the hole 2a in the axial direction. The bushing 8 is thereby positioned in the axial direction.

The rib 8d projects from the outer peripheral portion of the housing portion 8b in the radial direction and extends in the axial direction. In the present embodiment, a plurality of the ribs 8d are disposed at intervals in the circumferential direction.

The bearing 9 is attached to the housing portion 8b of the bushing 8. The bearing 9 supports the rear end of the pinion gear 7 so as to be freely rotatable. The bearing 9 has an outer race 9a and an inner race 9b. The outer race 9a is in contact with the inner peripheral portion of the housing portion 8b. The outer race 9a is in contact with the connection portion 8c in the axial direction. The inner race 9b is in contact with the outer peripheral portion of the pinion gear 7. A gap is disposed between the inner race 9b and the support portion 8a in the axial direction, such that the inner race 9b does not come into contact the support portion 8a and the connection portion 8c.

In the spinning reel 100 configured as described above, since the spool shaft 4 is supported by the support portion 8a of the bushing 8 that is fixed by being press-fit into the hole 2a of the reel body 2, it is possible to accurately support the spool shaft 4 with the support portion 8a of the bushing 8. That is, the portions that affect the rattling of the spool shaft 4 in the radial direction with respect to the reel body 2 are the inner diameter of the support portion 8a of the bushing 8 and the outer diameter of the spool shaft 4, so there are few portions that affect the rattling of the spool shaft 4 in the radial direction. As a result, since the rattling of the spool shaft 4 in the radial direction with respect to the reel body is suppressed, it is possible to improve the sliding feeling when the spool shaft 4 moves in the axial direction in reciprocating fashion.

In addition, since the bearing 9 is supported by the reel body 2 via the housing portion 8b of the bushing 8, for example, compared to a situation in which the bearing 9 is directly disposed in the reel body 2, the bearing 9 can be accurately supported. It is thereby possible to accurately support the pinion gear 7 with the bearing 9.

OTHER EMBODIMENTS

One embodiment of the present invention was described above, but the present invention is not limited to the above-described embodiment, and various modifications can be made without departing from the scope of the invention. Specifically, the various embodiments and modified examples described in the present Specification can be combined in any manner deemed necessary.

What is claimed is:
1. A spinning reel for casting a fishing line in a forward direction, comprising:
a reel body;
a spool shaft supported by the reel body so as to be movable in the longitudinal direction;

a pinion gear having a tubular shape and an interior, the spool shaft penetrating through the interior;

a bushing having a support portion supporting the spool shaft, and a housing portion that has a larger diameter than an inner diameter of the support portion and that is fixed to the reel body by press-fitting; and a bearing attached to the housing portion of the bushing and supporting the pinion gear, the bearing having an outer race contacting an inner peripheral portion of the housing portion of the bushing, and an inner race contacting an outer peripheral portion of the pinion gear.

2. The spinning reel according to claim 1, wherein the reel body has a hole, and the bushing is press-fitted into the hole, and the bushing has a rib protruding from an outer peripheral portion in a radial direction.

3. The spinning reel according to claim 2, wherein the rib projects from the outer peripheral portion of the housing portion in the radial direction and extends in an axial direction of the spool shaft.

4. The spinning reel according to claim 1, wherein the housing portion has a cylindrical shape and is integrally formed with the support portion.

5. The spinning reel according to claim 1, wherein the housing portion extends in an axial direction of the spool shaft.

\* \* \* \* \*